Patented Aug. 29, 1950

2,520,440

UNITED STATES PATENT OFFICE 2,520,440

PARTIAL HYDROGENATION OF UNSATURATED GLYCERIDE OILS IN SOLVENTS

Judson H. Sanders, Cincinnati, Ohio, assignor to The Procter and Gamble Company, Ivorydale, Ohio, a corporation of Ohio No Drawing. Application May 2, 1947, Serial No. 745,664

6 Claims. (Cl. 260—409)

This invention relates to the partial hydrogenation of unsaturated glyceride oils containing polyethylenic double bonds, for use in the manufacture of plastic shortening. More specifically it deals with processes for partially hydrogenating such oils while dissolved in a volatile fat solvent, and with outstandingly desirable products of these processes.

Laboratory hydrogenations of various organic substances have at times been conducted with the substance dissolved in an organic solvent, and this practice has also been suggested as a means of facilitating the complete saturation of unsaturated fatty acid radicals of coconut oil, which is a difficult accomplishment under ordinary hydrogenation conditions. The use of a solvent has also been proposed as a general means of speeding up the rate of reaction of hydrogen with unsaturated oils. It has not heretofore been proposed or known, to the present applicant's knowledge, that by partially hydrogenating unsaturated oils under suitably chosen conditions, and while dissolved in a solvent, one may produce base stocks for use in plastic shortenings having an unexpectedly superior consistency-keeping quality relationship.

The keeping quality of an unsaturated glyceride oil, intended for use as a component of plastic shortening, is improved in proportion to the conversion of its linoleic and other polyethylenic fatty acid radicals to oleic or other monoethylenic fatty acid radical. This conversion by catalytic hydrogenation is, however, invariably accompanied by side reactions which change the oil to a fat which increases in plastic firmness (judged at room temperature) as the hydrogenation proceeds. These side reactions include the conversion of unsaturated fatty acid radicals to saturated radicals and the conversion of unsaturated radicals to unsaturated isomeric forms having melting points above room temperature. As a result of these side reactions the hydrogenated shortening frequently (nearly always in the case of shortening made entirely from cottonseed oil) becomes as firm as is acceptable in kitchen and bakery practice before all of its linoleic fatty acid radicals have been hydrogenated.

The gist of the present invention is applicant's discovery that fatty acid radicals having polyethylenic double bonds may be converted to radicals containing but one carbon to carbon double bond with surprisingly little simultaneous saturation of the latter radicals and with surprisingly little formation of radicals of those isomers of monoethylenic fatty acids which are solid at room temperature, by catalytically hydrogenating the unsaturated oil while it is partially or completely dissolved in an appropriate amount of a volatile fat solvent which is substantially inert under the conditions of treatment, provided that the reaction conditions employed fall within certain limits, hereinafter more particularly defined.

As applied to the partial hydrogenation of a predominantly unsaturated vegetable oil such as cottonseed oil or soybean oil, this means that the combined linoleic acid content of the oil may be reduced to a lower value than is possible by known means of hydrogenation in the absence of a fat solvent, before the hydrogenated product exceeds any desired upper limit of plastic firmness. The keeping qualities of a shortening having plastic firmness may thus be greatly enhanced.

If desired one may take advantage of the benefits of the discovery in an alternative manner, namely, by hydrogenating the oil to some normal or required keeping quality value, and at this value obtaining a fat of much more workable consistency than could be obtained by conventional hydrogenation.

It is common experience in conventional practice that when hydrogenation conditions are such as to favor a high degree of "selection" (i. e. the tendency to favor the hydrogenation of the more unsaturated fatty acid radicals before the hydrogenation of the less unsaturated radicals) the formation of esters of solid isomers of oleic acid, commonly referred to as "isooleic acid," then occurs in such quantity as largely to offset the advantage gained by the high selectivity, the additional isooleic esters thus formed having a firming effect upon a shortening comparable to the firming effect of the esters of such additional saturated fatty acids as would have been formed under less selective conditions. Thus the amount of "solid" fatty acid radicals (i. e. the sum of the saturated and isooleic acid radicals) in a glyceride oil hydrogenated to any given consistency value tends to reach a more or less fixed level, regardless of the degree of selectivity obtained during hydrogenation, and any reduction in amount of solid fatty acid radicals for this consistency value is obtained with difficulty if at all.

The present process, on the contrary, results in improving "selection" to a greater extent than it increases the formation of "isooleic acid" radicals; or, stated differently, while hydrogenating linoleic acid radicals by the present process one not only obtains very little inadvertent hydrogenation of oleic acid radicals to stearic, but at the same time one also substantially avoids the inadvertent creation of isooleic acid radicals.

Inasmuch as most glycerides which contain either two or three isooleic acid radicals melt at temperatures in the neighborhood of 90° to 100° F., and resolidify at temperatures below this range, a shortening containing substantial amounts of such glycerides which was originally plasticized at temperatures below 80° F. will become undesirably firmer or less plastic when brought to 90–100° F. and then again returned (without agitation) to normal temperature. The present process avoids this instability of plastic qualities to the extent that it inhibits the formation of isooleic acid radicals.

Somewhat similarly, di-saturated mono-unsaturated gycerides melt and/or partially dissolve in liquid glycerides at temperatures between 70° F. and 100° F., and resolidify when again brought to 70°, and in resolidifying cause an abnormal firming of the product. To the extent that the present process inhibits the saturation of unsaturated radicals it minimizes this undesirable tendency.

The explanation of the superiority of the results obtained by the present process appears to lie in its ability to hydrogenate selectively at comparatively low temperatures. The table which follows Example 5 clearly illustrates the well known fact that in nonsolvent hydrogenation poor selection occurs when hydrogenating in the lower temperature ranges, this being shown by the increasingly higher amounts of saturated acids formed at the lower temperatures in oil hydrogenated to any given linoleic acid content. With the present solvent hydrogenation, on the contrary, the same low range of temperatures (which in the case of both processes is conducive to relatively low isooleic acid formation) produces excellent selectivity and results in a product surprising low in combined saturated fatty acid content together with greatly reduced linoleic content.

The term "plastic shortening" is intended to include within its meaning not only water-free shortening but also water-containing shortening such as margarine.

An object of the invention is to provide a practical and advantageous method of partially hydrogenating unsaturated glyceride oils containing fatty acid radicals having polyethylenic linkages in a manner favorable both to "selection" and to minimum "isooleic" formation.

Another object is to provide a method of preparing base stocks for hydrogenated plastic shortening, having exceptional keeping qualities.

Another object is to provide a method of preparing base stocks for hydrogenated plastic shortening having exceptionally soft consistency, together with normal or required keeping qualities.

Another object is to provide a method of selectively hydrogenating the more unsaturated fatty acids of unsaturated glyceride oils in preference to the less unsaturated radicals without simultaneously offsetting this advantage by the formation of corresponding amounts of isooleic acid radicals.

Another object is to produce hydrogenated fat of any desired reduction of combined linoleic acid content, having a lower total of combined saturated acids and combined isooleic acids than has heretofore been obtainable with the same reduction in combined linoleic acid content.

Another object is to provide a novel and superior partially hydrogenated cottonseed oil containing less solid fatty acid radicals, for any given reduction in linoleic acid radicals, than heretofore produced.

Another object is to provide a method of producing a hydrogenated fat of any desired reduction in iodine value, suitable for use as a base stock in plastic shortening, which is exceptionally soft in consistency for its iodine value.

Another object is to provide a method of producing a hydrogenated plastic shortening having an improved stability of room temperature plastic qualities, after prolonged storage up to 100° F., for any given initial consistency value.

Another object is to provide a method for producing a hydrogenated plastic shortening having an acceptable consistency over a broad range of household temperatures.

The process herein described and claimed is generally applicable to the treatment of those vegetable oils which have iodine values between about 90 and 140, such as cottonseed oil, peanut oil, sesame oil, and soybean oil, to produce partially hydrogenated fats having iodine values between about 50 and about 90, for use either alone or blended with "hard stock" and/or with unhydrogenated oil in the manufacture of plastic shortenings. It will also find application in the partial hydrogenation of lard, particularly to improve its keeping qualities, and in the partial hydrogenation of marine oils. Mixtures of any of these oils with one another or with other glyceride oils such as palm oil are also suitable for treatment by my process.

The following examples will aid in understanding the invention.

*Example 1.*—60 parts by weight of refined and bleached cottonseed oil are mixed with 40 parts by weight of ethyl alcohol (Formula 3A). This mixture is charged into an enclosed hydrogenation machine together with an amount of highly active promoted nickel hydrogenation catalyst containing 0.1 pound of nickel per 100 pounds of the aforesaid mixture. Any air present in the machine is purged by introducing a slow stream of hydrogen at the bottom and venting it from the top, whereupon the exhaust valve is closed. Mechanical agitation is started and heat is supplied to the charge in the machine until its temperature is 90° C. At this point a stream of compressed hydrogen is introduced into the bottom of the machine and a gauge pressure of 150 pounds per square inch is maintained in the machine by controlling the hydrogen feed. The temperature of the charge in the machine is maintained close to 90° C. by means of cooling medium circulated through a coil in the machine or through a jacket surrounding the machine. The course of the reaction is followed by withdrawing small samples from time to time, distilling off the solvent and measuring the refractive index of the oil. When the hydrogenation has proceeded to a point corresponding to an iodine value of about 70, the mechanical agitation is stopped, the hydrogen feed is discontinued, the charge is cooled in the machine, the catalyst is removed by filtration, and the solvent is removed from the hydrogenated product by distillation.

This process may be conveniently carried out as a continuous operation by pumping the oil-solvent mixture through a preheater and into and through a continuous hydrogenation machine, while simultaneously introducing a slurry of the catalyst suspended in a small amount of the oil to be hydrogenated and simultaneously introducing an adequate supply of hydrogen, the hydrogenation machine being provided with vigorous mechanical agitation, and preferably being subdivided into a plurality of chambers through which the reaction mixture passes in series, the chambers being connected with one another by means of restricted communicating passages. Apparatus especially suitable for the purpose is shown in the several applications in the names of Mills, Sanders and Hawley filed concurrently herewith.

*Example 2.*—Refined and bleached soybean oil is mixed with about 3 parts by volume of methyl Cellusolve (2-methoxy-ethanol) which has been freed of catalyst poisons. The temperature is raised to 70° C. to produce two liquid phases, one containing about 55% to 60% of the soybean oil with an iodine value of about 130, and the other containing about 40% to 45% of the oil with an iodine value of about 140, and this temperature is maintained during the subsequent hydrogenation. This mixture of liquid phases is hydrogenated essentially as in Example 1, the hydrogen being introduced under a pressure well in excess of the vapor pressure of the solvent at the hydrogenating temperature. The more unsaturated phase hydrogenates more rapidly, and as the hydrogenation proceeds in this phase there is a transfer of the hydrogenated glycerides to the less unsaturated phase, thus tending to prevent a decrease in the hydrogenation rate of the more unsaturated phase. The hydrogenation is advantageously continued until the weighted average iodine value of the oil dissolved in the two phases has been reduced to about 70, whereupon the solvent is removed by vaporization. The resulting product has good keeping qualities combined with excellent consistency.

*Example 3.*—A solution of 65 parts by weight of refined and bleached cottonseed oil and 35 parts by weight of ethanol (Formula 3A) was hydrogenated at 60° C. for 15 minutes to an iodine value (of the oil, after removal of solvent) of 67 in a mechanically agitated vessel into the bottom of which a stream of hydrogen gas was continuously introduced under a gauge pressure of 150 pounds per square inch (total gas phase pressure), and in the presence of promoted nickel catalyst, the amount of catalyst in terms of its nickel content being 0.2% of the weight of the oil.

Following the hydrogenation the bulk of the alcohol was removed by distillation, following which the oil was filtered for removal of catalyst. 94 parts by weight of the hydrogenated product were blended with 6 parts of cottonseed oil "hard stock," i. e. substantially fully hydrogenated cottonseed oil, and the mixture was deodorized, and then plasticized to produce dry plastic shortening by chilling and whipping in well known manner. The shortening thus made had a penetration value under standardized test conditions of 225 units at 70° F., and its hydrogenated base stock had an oxygen absorption time under standardized test conditions of 30 hours.

For comparison, another lot of refined and bleached cottonseed oil was hydrogenated without solvent in 5 minutes at 110° C. at 100 p. s. i. gauge pressure, using 0.1% of nickel in promoted nickel catalyst, in a continuous process to an endpoint such that when 94 parts of the hydrogenated product were blended with 6 parts of cottonseed oil hard stock and plasticized the same penetration value was obtained as in the case of the solvent hydrogenated product. The iodine value of the base stock in this case was 75, and its oxygen absorption time was only 17 hours.

As another comparison, another lot of the refined and bleached oil was batch hydrogenated without solvent in 80 minutes at 165° C., at slightly above atmospheric pressure, using 0.03% of a different promoted nickel catalyst (one more suitable for high temperature service than for low), to an endpoint such that when 94 parts by weight of the hydrogenated product were blended with 6 parts of cottonseed oil hard stock and plasticized the same consistency value was obtained as in the case of the solvent hydrogenated product. The iodine value of the base stock in this case was 80 and its oxygen absorption time was only 17 hours.

Other comparative runs established the fact that the large advantage in keeping quality of the solvent hydrogenated product as compared with the other two products is truly attributable to the use of the solvent in the hydrogenation of the base stock, as it is far beyond the possible net effects of such differences as there were in the hydrogenation temperature, pressure, amount and character of catalyst, and conditions of agitation.

In addition to its great superiority in oxygen absorption time, the shortening made from the solvent hydrogenated base stock had a much greater stability of plastic quality than either of the products made from base stock hydrogenated without solvent. After tempering two samples of each of the three products for one day at 90° F. one sample of each was returned to 70° F. while the other sample of each was stored for 24 hours at 100° F. and then returned to 70° F. A day after returning to 70° F. the penetration of each sample was determined. The solvent processed product which had been exposed to 100° F. was found to have firmed 36 penetration units as compared with its companion sample, whereas the non-solvent processed products had firmed 58 units and 51 units, respectively.

*Example 4.*—A pair of hydrogenations of a 50-50 mixture of refined and bleached cottonseed and soybean oils, one in solvent (68 parts oil and 32 parts ethanol, by weight) and the other without solvent serve as an additional illustration of the ability of the present process to improve the stability of consistency and to extend the temperature range within which the shortening has acceptable consistency, the processing conditions and results being as follows:

|  | With Solvent | No Solvent |
|---|---|---|
| Type of process | (¹) | (²) |
| Hydrogenation temperature, °C | 90 | 165 |
| Gas phase pressure, p. s. i. gauge | 150 | (³) |
| Time of hydrogenation, minutes | 11 | 85 |
| I. V. of hydrogenated base stock | 75 | 80.5 |
| Percent hard stock blended into shortening | 12 | 8 |
| Penetration value at 70° F | 225 | 225 |
| Temperature at which pen. was 200 | 64 | 65 |
| Temperature at which pen. was 300 | 87 | 81 |
| Plastic range (200–300 pen.) | 23 | 16 |
| Firming of 70° pen. caused by 100° F. storage | 10 | 30 |

¹ Continuous.  ² Batch.  ³ Just above atmos.

The oxygen absorption time of the solvent processed material was somewhat poorer than that of the blank, but this disadvantage is more than offset by the great gain in plastic properties.

*Example 5.*—The following pair of hydrogenations of refined and bleached cottonseed oil, one in solvent (60 parts of oil and 40 parts of ethanol, by weight), clearly shows the improved elimination of linoleic acid radicals together with a softer consistency resulting from the practice of the invention, the processing conditions and results being as follows:

|  | With Solvent | Without Solvent |
|---|---|---|
| Type of process | Batch | Batch |
| Hydrogenation temperature, °C | 70 | 70 |
| Gas phase pressure, p. s. i. | 150 | 150 |
| Catalyst (as per cent Ni) | 0.1 | 0.1 |
| Time of hydrogenation, minutes | 28 | 157 |
| I. V. of hydrogenated base stock | 67 | 67 |
| Congeal point, °C | 24.3 | 29.2 |
| Per cent linoleic acid in total fatty acids | 9.1 | 15.1 |
| Per cent normal oleic acid in total fatty acids | 51.1 | 43.7 |
| Per cent isooleic acids in total fatty acids | 8.0 | 5.4 |
| Per cent saturated acids in total fatty acids | 31.8 | 35.8 |
| Total per cent solid acids (isooleic plus saturated) | 39.8 | 41.2 |

The following table shows typical results of my solvent hydrogenation process as compared with non-solvent hydrogenation as applied to a hydrogenation of cottonseed oil to three different combined linoleic acid contents, the combined fatty acids of which initially consisted of about 51 per cent linoleic, about 24 per cent saturated, and about 2 per cent isooleic acids. The data are based on batch operation.

|  | Hydrogenated without solvent at 100 p. s. i. gauge | | | | Hydrogenated in solvent at 150 p. s. i. | |
|---|---|---|---|---|---|---|
| Hydrogenation temp., °C | 165 | 115 | 90 | 60 | 100 | 80 |
| 20.0% linoleic: | | | | | | |
| Per cent saturated | 26.2 | 29.2 | 33.7 | 35.9 | 25.5 | 27.6 |
| Per cent isooleic | 9.7 | 7.2 | 6.0 | 4.6 | 5.6 | 4.5 |
| Total per cent solid | 35.9 | 36.4 | 39.7 | 40.5 | 31.1 | 32.1 |
| 10.0% linoleic: | | | | | | |
| Per cent saturated | 27.7 | 32.5 | *39.3 | 44.1 | **28.2 | 29.8 |
| Per cent isooleic | 15.0 | 9.4 | 7.1 | 4.7 | 8.3 | 6.6 |
| Total per cent solid | 42.7 | 41.9 | 46.4 | 48.8 | 36.5 | 36.4 |
| 5.0% linoleic: | | | | | | |
| Per cent saturated | 29.4 | 36.5 | 45.5 | 57.0 | 31.1 | 32.6 |
| Per cent isooleic | 21.3 | 10.5 | 7.4 | 4.5 | 9.3 | 7.4 |
| Total per cent solid | 50.7 | 47.0 | 52.9 | 61.5 | 40.4 | 40.0 |

Typical comparison of changes in composition as shown by starred values in above table:

|  | Reduction in Linoleic | Increase in Isooleic | Calculated Increase in Normal Oleic | Increase in Saturated |
|---|---|---|---|---|
| No solvent* | 41 | 5.1 | 20.6 | 15.3 |
| With solvent (interpolated to 90° C.)** | 41 | 5.4 | 30.6 | 5.0 |

The American Oil Chemists' Society's official methods of analysis were used in determining the above values, the Twitchell method for isooleic acids, and the thiocyanogen method for saturated and linoleic acids.

The partially hydrogenated cottonseed oils produced by my solvent hydrogenation process, typified by the data in the last two columns on the right of the above table, are believed to be unique, no such oils heretofore known having contained less, for example, than 34 per cent solid acids (combined as glycerides) at a 20 per cent linoleic acid content, or less than 40 per cent solid acids at a 10 per cent linoleic acid content, or less than 45 per cent solid acids at a 5 per cent linoleic acid content. Corresponding values for other percentages of combined linoleic acid may readily be calculated by graphical interpolation and extrapolation from the foregoing data. The novel partially hydrogenated cottonseed oil products of the present invention, when converted to conventional plastic condition, have exceptionally broad plastic ranges and exceptionally good stability of plasticity.

The solvent which may be employed in this process is any which is not appreciably reactive towards hydrogen or towards the glyceride oil under the conditions of the process, which contains no significant amount of any catalyst "poison" or hydrogenation inhibitor, and which is sufficiently volatile to be readily separated from the hydrogenated oil by vaporization at temperatures not over about 200° C. In the accompanying claims such a solvent is referred to as a suitable inert volatile fat solvent. A very great many organic solvents, including most of the commoner solvents, are entirely suitable in this sense, the preferred solvents in order of preference being ethyl alcohol, methyl alcohol, ispropyl alcohol, cyclohexanol, acetone, and ethyl ether. Unpurified commercial hexane, petroleum ether, and dioxane tend to slow down the reaction rate and are thus undesirable.

I have found that beyond an optimum amount of solvent which for ethyl alcohol at a hydrogenation temperature of 70° C. and a pressure of 150 p. s. i. is an amount about equal to the weight of the oil, increasing amounts of solvent become progressively less desirable from the standpoint of product quality. The upper limit for preferred results is 3 parts of solvent to one part of oil. The lower limit, on the same basis, is 0.05 part of solvent to one part of oil—amounts of solvent as small as this having been found to give very substantial benefits in hydrogenation results. In some cases complete mutual solubility of oil and solvent is not obtained, particularly with selective solvents. An exception to the foregoing generality as to upper limit of solvent is the use of a selective solvent (i. e. one capable, under the conditions of the process, of extracting a comparatively high iodine value fraction from the oil in a liquid phase distinct from the liquid phase containing the lower iodine value oil residue, e. g. furfural) of comparatively low oil-dissolving capacity to produce two phases, liquid propane near its critical temperature being an example of such a selective solvent. When solvent of this character is used the ratio of solvent to oil on a weight basis need not exceed 15 to 1. Mixtures of two or more solvents are at times advantageous, particularly for two-phase hydrogenation as in Example 2.

The process of my invention is not limited to removing the solvent, subsequent to the hydrogenation, by distillation. For some purposes it may be desirable to retain the oil in the solvent during subsequent processing (particularly filtration to remove catalyst). Any convenient method of solvent removal may ultimately be practiced, such as flash evaporation followed by stripping, or washing out by means of water or other liquid, etc.

Preferred hydrogenation temperatures tend to be lower than in most conventional non-solvent hydrogenation practice, lying within the range from 60° C. to 125° C. Above and below these limits the hydrogenation proceeds satisfactorily (although more slowly below 60° and more rapidly above 125°, of course), but does not produce the outstanding consistency-keeping quality advantage peculiar to the process claimed herein. Exceptionally good results have been obtained between 90° C. and 100° C.

The hydrogenation pressure which is the sum of the hydrogen partial pressure and the partial pressure of the volatile solvent in the oil-solvent solution at the hydrogenation temperature, is normally at least 50 to 100 p. s. i. gauge pressure (i. e. superatmospheric). The absolute partial pressure of the hydrogen in the vapor phase should be at least 20 and not over about 200 p. s. i. gauge for desirable consistency-keeping quality results, and is desirably from about 40 to about 140 p. s. i.

Any of the catalysts known to be effective in hydrogenating glyceride oils may be employed in the present process, relatively active nickel-containing catalysts promoted by one or more of the known catalyst promoters such as copper, chromium, cobalt, zirconium, thorium, or their oxides being preferred. A relatively large amount of catalyst is desirably used, although amounts containing nickel exceeding about 0.2 per cent of the weight of the oil to be hydrogenated have not been found necessary.

Effective agitation, to maintain the catalyst well suspended and distributed throughout the solution phase and to disperse the hydrogen and aid in its solution in this phase, is required for best results, mechanically induced agitation being preferred.

Having thus described my invention, what I claim and desire to secure by Letters Patent is:

1. The continuous process of partially hydrogenating unsaturated vegetable oils having iodine values between about 90 and about 140 and containing combined linoleic acid which comprises causing said oil, dissolved in from 0.05 to 15.0 parts by weight of an inert volatile fat solvent and at a temperature between 60° C. and 125° C., to flow into, through, and out of a confined hydrogenation zone in the presence of a highly active nickel-containing cataylst and hydrogen gas at a partial pressure of 20 to 200 pounds per square inch, discontinuing the hydrogenation before the iodine value of said oil falls below 50, and separating the hydrogenated oil from the solvent, from the catalyst, and from any unconsumed hydrogen; whereby materially more than half of the polyethylenic acid radicals of said oil which are reduced by said treatment are converted to normal oleic acid radicals and materially less than half are converted to saturated and isooleic acid radicals.

2. The process of claim 1 wherein the solvent is ethyl alcohol.

3. The process of claim 1 wherein the oil has a final iodine value between 50 and 90 and at least 20 below its initial value.

4. The method of making base stock for plastic shortening which comprises mixing one part of unsaturated vegetable oils having iodine values between about 90 and about 140 and containing linoleic acid radicals, with not over 15 parts by weight of a volatile selective fat solvent, mixing finely divided hydrogenation catalyst with the oil-solvent mixture, bringing hydrogen gas into intimate contact with the catalyst-liquid mixture while the reaction mass is at a temperature between 60° C. and 125° C. and such that two liquid phases exist, the partial pressure of the hydrogen in the gaseous phase being at least 20 and not over 200 pounds per square inch absolute, maintaining said mass under vigorous agitation and maintaining said hydrogen supply until a major portion of the polyethylenic acid radicals of said oil have been converted to less unsaturated condition but discontinuing the said hydrogenation conditions before the iodine value of the oil has fallen below 50, and separating the hydrogenated oil from the solvent, from the catalyst, and from any unconsumed hydrogen.

5. The continuous process of partially hydrogenating unsaturated vegetable oils having iodine values between about 90 and about 140 and containing combined linoleic acid which comprises causing said oil, dissolved in from 0.1 to 3.0 parts by weight of an inert volatile fat solvent and at a temperature between 60° C. and 125° C., to flow into, through, and out of a confined hydrogenation zone in the presence of a highly active nickel-containing hydrogenation catalyst and hydrogen gas at a partial pressure of 20 to 200 pounds per square inch, discontinuing the hydrogenation before the iodine value of said oil falls below 50, and separating the hydrogenated oil from the solvent, from the catalyst, and from any unconsumed hydrogen; whereby materially more than half of the polyethylenic acid radicals of said oil which are reduced by said treatment are converted to normal oleic acid radicals and materially less than half are converted to saturated and isooleic acid radicals.

6. The continuous process of partially hydrogenating unsaturated vegetable oils having iodine values between about 90 and about 140 and containing combined linoleic acid which comprises causing said oil, distributed between two liquid solvent phases, to flow into, through, and out of a confined hydrogenation zone in the presence of a highly active hydrogenation catalyst and hydrogen gas at a partial pressure of 20 to 200 pounds per square inch and under conditions of extreme turbulence, discontinuing the hydrogenation before the iodine value of said oil, judged after removal of solvent and after combining the oil of the two phases, falls below 50, and separating the hydrogenated oil from the solvent, from the catalyst, and from any unconsumed hydrogen, the solvent employed being a selective solvent adapted to fractionate the oil into more unsaturated and less unsaturated portions, the amount of solvent being not more than fifteen times the weight of the oil and the temperature of hydrogenation being between 60° C. and 125° C. and such as to permit the existence of two liquid phases.

JUDSON H. SANDERS.

(References on following page)

REFERENCES CITED

The following references are of record in the file of this patent:

UNITED STATES PATENTS

| Number | Name | Date |
|---|---|---|
| 1,097,456 | Maryott | May 19, 1914 |
| 1,856,120 | Valentine | May 3, 1932 |
| 2,163,602 | Jenness | June 27, 1939 |
| 2,163,603 | Jenness | June 27, 1939 |
| 2,164,291 | Jenness | June 27, 1939 |
| 2,389,284 | Turck | Nov. 20, 1945 |